United States Patent
Wu et al.

(10) Patent No.: US 12,276,968 B2
(45) Date of Patent: Apr. 15, 2025

(54) SMART MAGIC CUBE CONTROLLER

(71) Applicant: Gree Electric Appliances, Inc. of Zhuhai, Guangdong (CN)

(72) Inventors: Xiaomin Wu, Guangdong (CN); Zehan Tan, Guangdong (CN); Shengjie Lin, Guangdong (CN); Shaobin Li, Guangdong (CN); Yanyu Chen, Guangdong (CN); Shengshi Ye, Guangdong (CN); Ru Li, Guangdong (CN)

(73) Assignee: Gree Electric Appliances, Inc. of Zhuhai, Guangdong (CN)

( * ) Notice: Subject to any disclaimer, the term of this patent is extended or adjusted under 35 U.S.C. 154(b) by 338 days.

(21) Appl. No.: 17/624,640

(22) PCT Filed: Dec. 25, 2019

(86) PCT No.: PCT/CN2019/128414
§ 371 (c)(1),
(2) Date: Jan. 4, 2022

(87) PCT Pub. No.: WO2021/036130
PCT Pub. Date: Mar. 4, 2021

(65) Prior Publication Data
US 2022/0260969 A1    Aug. 18, 2022

(30) Foreign Application Priority Data
Aug. 30, 2019    (CN) .......................... 201910817827.4

(51) Int. Cl.
G05B 19/418    (2006.01)
A63F 9/08    (2006.01)
(Continued)

(52) U.S. Cl.
CPC .......... *G05B 19/418* (2013.01); *A63F 9/0826* (2013.01); *G05B 15/02* (2013.01);
(Continued)

(58) Field of Classification Search
CPC ......... G06F 2203/04802; G06F 3/0346; G06F 3/04815; G06F 3/0482; G06F 3/0488;
(Continued)

(56) References Cited

U.S. PATENT DOCUMENTS 5,262,777 A * 11/1993 Low ...................... G06F 3/0346
345/157
5,703,623 A * 12/1997 Hall ....................... G06F 3/0346
345/157
(Continued)

FOREIGN PATENT DOCUMENTS

CN    101690847    4/2010
CN    101833286    9/2010
(Continued)

OTHER PUBLICATIONS

International Search Report in International Appln. No. PCT/CN2019/128414, dated Jun. 4, 2020, 8 pages (with English Translation).
(Continued)

*Primary Examiner* — Darrin D Dunn
(74) *Attorney, Agent, or Firm* — Fish & Richardson P.C.

(57) ABSTRACT

Disclosed is a smart magic cube controller. The smart magic cube controller includes: a controller body, the controller body has a plurality of surfaces, and at least one surface of the controller body is configured to be a display module; an posture sensing module; and a control module in signal connection with the posture sensing module, wherein the control module is configured to determine a current top surface of the controller body according to placement state information collected by the posture sensing module, and
(Continued)

transmits, according to the determined current top surface, a scene mode control instruction corresponding to the current top surface, and when the display module is located on a surface, other than the current top surface and the bottom surface of the controller body, the control module is configured to control a display picture of the display module to be displayed upright.

10 Claims, 2 Drawing Sheets

(51) Int. Cl.
| | |
|---|---|
| G05B 15/02 | (2006.01) |
| G05B 19/042 | (2006.01) |
| G06F 3/0346 | (2013.01) |
| G06F 3/046 | (2006.01) |

(52) U.S. Cl.
CPC ............ *G06F 3/0346* (2013.01); *G06F 3/046* (2013.01); *G05B 19/042* (2013.01); *G05B 2219/23043* (2013.01); *G05B 2219/2642* (2013.01); *G06F 2203/04802* (2013.01)

(58) Field of Classification Search
CPC ............... G06F 3/0362; G06F 3/03543; G06F 2200/1636; G06F 2203/0384; G06F 2200/1637; G06F 2203/04101; G05B 15/02; G05B 19/409; G05B 2219/2614; G05B 2219/2642; F24F 11/56; F24F 11/65
See application file for complete search history.

(56) References Cited

U.S. PATENT DOCUMENTS

| | | | | |
|---|---|---|---|---|
| 5,729,249 A | * | 3/1998 | Yasutake | G06F 3/0362 345/157 |
| 6,597,347 B1 | * | 7/2003 | Yasutake | G06F 3/0338 345/157 |
| 2003/0103038 A1 | * | 6/2003 | Wong | G06F 1/1626 345/158 |
| 2004/0104932 A1 | * | 6/2004 | Brebner | G06F 3/011 715/744 |
| 2004/0201595 A1 | * | 10/2004 | Manchester | G09G 5/37 345/649 |
| 2008/0024427 A1 | * | 1/2008 | Kuo | G02F 1/136204 345/107 |
| 2009/0146803 A1 | * | 6/2009 | Sellen | G08B 1/08 340/539.1 |
| 2009/0179586 A1 | * | 7/2009 | Cortenraad | H05B 45/20 315/292 |
| 2011/0109538 A1 | * | 5/2011 | Kerr | G09G 5/36 715/765 |
| 2013/0038634 A1 | * | 2/2013 | Yamada | G09G 5/00 345/649 |
| 2014/0267006 A1 | * | 9/2014 | Raffa | G06F 3/013 345/156 |
| 2014/0285400 A1 | * | 9/2014 | Sato | G06F 3/1446 345/1.3 |
| 2015/0067603 A1 | * | 3/2015 | Tanaka | G06F 3/0383 715/828 |
| 2017/0201579 A1 | * | 7/2017 | Peixoto Guimarães Ubirajara e Silva | H04L 67/34 |
| 2018/0290068 A1 | * | 10/2018 | Moody | A63H 33/042 |
| 2021/0271215 A1 | * | 9/2021 | Ju | H04L 12/2816 |

FOREIGN PATENT DOCUMENTS

| | | |
|---|---|---|
| CN | 102184022 | 9/2011 |
| CN | 102755734 A | 10/2012 |
| CN | 103312881 | 9/2013 |
| CN | 103366705 A | 10/2013 |
| CN | 104615781 | 5/2015 |
| CN | 104898920 A | 9/2015 |
| CN | 105045395 | 11/2015 |
| CN | 106094535 | 11/2016 |
| CN | 106227055 A | 12/2016 |
| CN | 106354107 | 1/2017 |
| CN | 106355852 | 1/2017 |
| CN | 106383452 A | 2/2017 |
| CN | 107229237 | 10/2017 |
| CN | 107665080 | 2/2018 |
| CN | 107820352 | 3/2018 |
| CN | 108469740 | 8/2018 |
| CN | 109884911 | 6/2019 |
| CN | 109945411 | 6/2019 |
| CN | 110012530 A | 7/2019 |
| CN | 110022401 | 7/2019 |
| EP | 3095099 | 11/2019 |
| JP | 2018067133 | 4/2018 |

OTHER PUBLICATIONS

CN Office Action in Chinese Appln. No. 201910817827.4, dated Aug. 13, 2021, 14 pages (with English Translation).
CN Office Action in Chinese Appln. No. 201910817827.4, dated Feb. 24, 2022, 19 pages (with English Translation).
International Preliminary Report on Patentability in International Appln. No. PCT/CN2019/128414, dated Mar. 1, 2022, 9 pages (with English Translation).
Written Opinion of the International Searching Authority in International Appln. No. PCT/CN2019/128414, dated Jun. 4, 2020, 7 pages (with English Translation).
Internet of Things: Smart Home Engineering Design and Construction Technology, Xu (ed.), Jan. 2012, 360-380, 56 pages (with English machine translation).

* cited by examiner

SMART MAGIC CUBE CONTROLLER

CROSS-REFERENCE TO RELATED APPLICATIONS

This disclosure is a U.S. National Phase application under 35 U.S.C. § 371 of International Patent Application No. PCT/CN2019/128414, filed on Dec. 25, 2019, which claims priority to Chinese patent application No. 201910817827.4, entitled "SMART MAGIC CUBE CONTROLLER", filed on Aug. 30, 2019, the entire contents of which are incorporated herein by reference.

TECHNICAL FIELD

The present disclosure relates to the technical field of intelligent control technology, and more particularly, to a smart magic cube controller.

BACKGROUND

With the development of intelligent control technology, the control of various electrical appliances now tends to be simplified and intelligent, for a smart controller with a magic cube shape, it is a very convenient smart controller. The magic cube smart controller can be operated to make the magic cube controller control home appliances. However, in some schemes known to the inventor, after the functions of the six sides of the magic cube smart controller are set, they are generally marked on each side by printing or labeling, and during use, after changing of the placement state of the magic cube smart controller, the directions of the labels on each side may be reversed or tilted, which is inconvenient for viewing and identifying, and inconvenient to use.

SUMMARY

The present disclosure discloses a smart magic cube controller, the smart magic cube controller is simple to operate and easy to use, and is equipped with a display module on the surface of the controller body, which can display the scene mode content of the corresponding surface, in addition, the display picture of the display module can always be displayed upright, thereby facilitating viewing and identifying.

In order to achieve the above objectives, the present disclosure provides the following technical schemes:

A smart magic cube controller, which includes:
a controller body, wherein the controller body has a plurality of surfaces, and at least one surface of the controller body is configured as a display module;
a posture sensing module configured to collect placement state information of the controller body;
a control module signally connected to the posture sensing module, wherein the control module is configured to determine a current top surface of the controller body according to the placement state information collected by the posture sensing module, and transmit a scene mode control instruction corresponding to the current top surface according to the determined current top surface, and when the display module is located on a surface other than the current top surface and the bottom surface of the controller body, the control module is configured to control a display picture of the display module to be displayed upright.

The above-mentioned smart magic cube controller is applied in a smart home environment. The smart magic cube controller is signally connected to a server, and the server is signally connected to a controlled device in the home environment, and the controlled device can be a home appliance, wherein, the controller body has a plurality of surfaces, and a posture sensing module configured to collect the placement state information of the controller body is provided in the controller body, which can sense the placement and action state of the controller body in real time. The control module can determine the current top surface of the controller body according to the placement state information collected by the posture sensing module, wherein, each surface of the controller body is configured with a corresponding scene mode. After the control module determines the current top surface, a scene mode control instruction corresponding to the current top surface can be transmitted according to the determined current top surface, wherein, the scene mode control instruction is sent to the server, and the server controls the home appliances in the home environment to adjust the home appliances according to the received scene mode control instructions, by simply flipping the smart magic cube controller, users can adjust and control the home environment by placing the desired scene mode on the top, thereby the operation being simple and easy to use. In addition, at least one surface of the controller body is set as a display module, and the display module is connected to the control module signal, which can display the content of the scene mode corresponding to the surface of the display module, thereby being convenient for the user to identify, wherein the display content of the display module can be controlled by the control module, and can be configured according to the scene mode of the corresponding surface, and when the scene mode of the display module is reconfigured, the display content of the display module can be adjusted accordingly, thereby being convenient to use. In addition, when the display module is on the side surface, that is, when it is not on the top surface or on the bottom surface, the control module can control the display direction of the display picture of the display module according to the placement state information collected by the posture sensing module, so that the display picture content of the display module is always displayed upright, thereby being convenient for users to view and identify, and being convenient to use. Moreover, the display module is used to display the content of the corresponding scene mode, and the display can be used for a long time, compared with the use of printing or labeling to mark the content of the scene mode, the display module can continuously display the content and will not be difficult to identify due to wear and tear, in addition, from the appearance effect, the smart magic cube controller has a sense of science and technology.

Therefore, the above-mentioned smart magic cube controller is simple to operate and convenient to use, and a display module is provided on the surface of the controller body, which can display the scene mode content of the corresponding surface, in addition, the display picture of the display module can always be displayed upright, thereby facilitating viewing and identifying.

Optionally, the control module includes: a posture information processing unit, a scene control unit, and a display control unit, wherein, the posture information processing unit is configured to determine the current top surface of the controller body according to the placement state information collected by the posture sensing module, the scene control unit is configured to transmit a scene mode control instruction corresponding to the current top surface according to the current top surface; when the display module in the controller body is located on a surface other than the current top surface and the bottom surface of the controller body, the display control unit is configured to control the display picture of the display module to be displayed upright according to the placement state information collected by the posture sensing module.

Optionally, the posture sensing module comprises at least one of a gyroscope and an acceleration sensor signally connected to the control module.

Optionally, each surface of the controller body is configured as the display module, and each of the display modules is signally connected to the control module.

Optionally, the display module is configured to display scene mode content or user preset content;

when a static time of the controller body is greater than a preset time, the control module is configured to control the display module to display the user preset content;

when the controller body moves, the control module is configured to control the display module to display the scene mode content.

Optionally, the user preset content comprises weather condition information, current temperature information, current humidity information, and current time information.

Optionally, the display module is configured to display the content of the scene mode corresponding to itself or the content of the scene mode corresponding to the current top surface;

when a static time of the controller body is greater than a preset time, the control module is configured to control the display module to display the content of the scene mode corresponding to the current top surface;

when the controller body moves, the control module is configured to control the display module to display the content of the scene mode corresponding to itself.

Optionally, the display module is an electronic ink screen.

Optionally, the controller body is a cube structure.

Optionally, the smart magic cube controller further includes a link module signally connected to the control module, and the link module is configured to be signally connected to a control terminal and a server.

Figure 1:
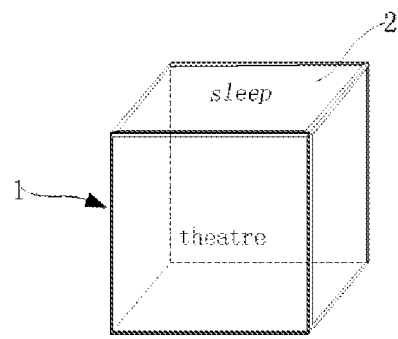
FIG. 1 is a structural schematic diagram of a smart magic cube controller provided by an embodiment of the present disclosure.

Reference numerals: 1. controller body; 2. display module; 3. posture sensing module; 4. control module; 41. posture information processing unit; 42. display control unit; 43. scene control unit.

DETAILED DESCRIPTION

The technical schemes in the embodiments of the present disclosure will be clearly and completely described below in conjunction with the accompanying drawings in the embodiments of the present disclosure. Apparently, the described embodiments are only a part of the embodiments of the present disclosure, rather than all the embodiments. Based on the embodiments in the present disclosure, all other embodiments obtained by those of ordinary skill in the art without creative work shall fall within the protection scope of the present disclosure.

Figure 2:
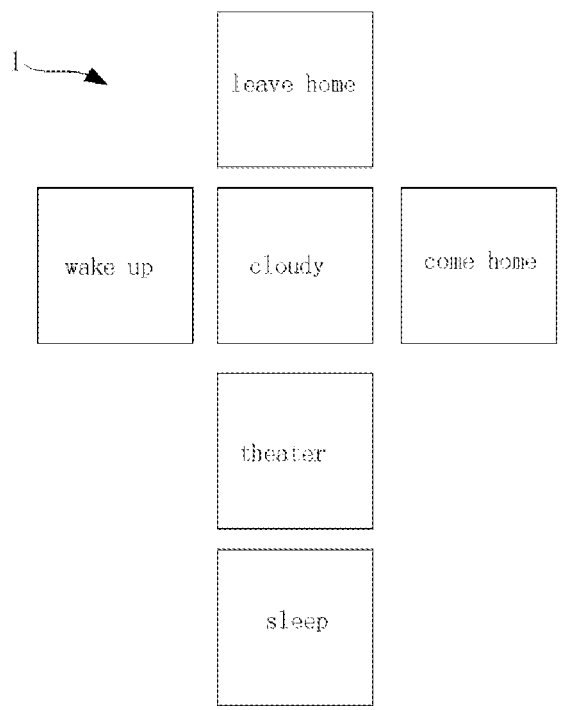
FIG. 2 is a schematic diagram of an expanded structure of each surface of a controller body provided by an embodiment of the present disclosure.
Figure 3:
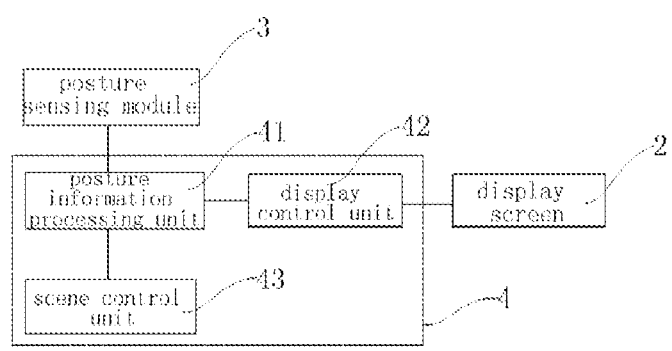
FIG. 3 is a schematic diagram of a control module of a smart magic cube controller provided by an embodiment of the present disclosure.

As shown in FIGS. 1 to 3, embodiments of the present disclosure provide a smart magic cube controller, which includes: a controller body 1, the controller body 1 has a plurality of surfaces, and at least one surface of the controller body 1 is configured as a display module 2; a posture sensing module 3 configured to collect placement state information of the controller body; a control module 4 signally connected to the posture sensing module, the control module 4 is configured to determine a current top surface of the controller body according to the placement state information collected by the posture sensing module 3, and transmit a scene mode control instruction corresponding to the current top surface according to the determined current top surface, and when the display module is located on a surface other than the current top surface and the bottom surface of the controller body, the control module is configured to control a display picture of the display module to be displayed upright.

The above-mentioned smart magic cube controller is applied in a smart home environment. The smart magic cube controller is signally connected to a server, and the server is signally connected to a controlled device in the home environment, and the controlled device can be a home appliance, wherein, the controller body is a cube structure, and a posture sensing module configured to collect the placement state information of the controller body is provided in the controller body, which can sense the placement and action state of the controller body in real time. The control module can determine the current top surface of the controller body according to the placement state information collected by the posture sensing module, wherein, each surface of the controller body is configured with a corresponding scene mode. After the control module determines the current top surface, a scene mode control instruction corresponding to the current top surface can be transmitted according to the determined current top surface, wherein, the scene mode control instruction is sent to the server, and the server controls the home appliances in the home environment to adjust the home appliances according to the received scene mode control instructions, for ease of understanding, for example, when the controller body has six surfaces, that is, the controller body can be a cube structure, the six surfaces of the controller body are set to six different scene modes: coming home, leaving home, sleeping, waking up, theater, cloudy, it should be noted that the setting of the scene mode can be customized according to actual needs, and which is not limited in this embodiment, wherein, in the control module, the above six scene modes are configured in a one-to-one correspondence with the six surfaces of the controller body, in addition, the control state and parameters of each home appliance in the above six scene modes have been pre-configured in the server, for example, in the sleeping scene mode, in the home appliance, the air conditioner is on, the temperature is 27° C., and the light is off; flipping the controller body so that the sleeping scene mode faces upwards, that is, the sleeping scene mode is on top, then, the control device can determine that the current top surface placed on the controller body is the sleeping scene mode according to the placement state information collected by the posture sensing module, and the control module sends the sleeping scene mode control instruction to the server, the server turns off the indoor lights and adjusts the air conditioner to the on state according to the received sleeping scene mode control instructions, and sets the temperature to 27° C., certainly, in this mode, there can also be control of other electrical appliances, and this embodiment will not describe them one by one, by simply flipping the smart magic cube controller, users can adjust and control the home environment by placing the desired scene mode on the top, thereby the operation being simple and easy to use. In addition, at least one surface of the controller body is set as a display module, and the display module is connected to the control module signal, which can display the content of the scene mode corresponding to the surface of the display module, the content of the corresponding scene mode displayed by the display module can be text content or pattern content, thereby being convenient for the user to identify, wherein, the display content of the display module can be controlled by the control module, and can be configured according to the scene mode of the corresponding surface, and when the scene mode of the display module is reconfigured, the display content of the display module can be adjusted accordingly, thereby being convenient to use. In addition, when the display module is on the side surface, that is, when it is not on the top surface or on the bottom surface, the control module can control the display direction of the display picture of the display module according to the placement state information collected by the posture sensing module, so that the display picture content of the display module is always displayed upright, thereby being convenient for users to view and identify, and being convenient to use. Moreover, the display module is used to display the content of the corresponding scene mode, and the display can be used for a long time, compared with the use of printing or labeling to mark the content of the scene mode, the display module can continuously display the content and will not be difficult to identify due to wear and tear, in addition, from the appearance effect, the smart magic cube controller has a sense of science and technology.

Therefore, the above-mentioned smart magic cube controller is simple to operate and convenient to use, and a display module is provided on the surface of the controller body, which can display the scene mode content of the corresponding surface, in addition, the display picture of the display module can always be displayed upright, thereby facilitating viewing and identifying.

Wherein, specifically, in an optional embodiment, each surface of the above controller body is set as a display module, and each display module is signally connected to the control module, the control module controls the display direction of the display picture of each display module according to the placement state information collected by the posture sensing module, the display pictures of the display modules on the side surfaces are all displayed upright, that is, the vertical display modules on the side surfaces always maintain an upright display.

In the above-mentioned smart magic cube controller, as shown in FIG. 3 in conjunction with FIG. 1, in an optional embodiment, the control module 4 specifically includes a posture information processing unit 41, a scene control unit 43, and a display control unit 42, wherein, the posture information processing unit 41 is configured to determine the current top surface of the controller body according to the placement state information collected by the posture sensing module, the scene control unit 43 is configured to transmit a scene mode control instruction corresponding to the current top surface according to the current top surface; when the display module in the controller body is located on the side surface of the controller body, the display control unit 42 is configured to control the display picture of the display module to be displayed upright according to the placement state information collected by the posture sensing module.

Specifically, in an optional embodiment, the above-mentioned posture sensing module includes at least one of a gyroscope and an acceleration sensor signally connected to the control module.

Specifically, in an optional embodiment, the display mode of the above-mentioned display module has multiple setting modes, such as:

Mode One

The display content of the above-mentioned display module is scene mode content or user preset content, wherein, when the static time of the controller body is greater than the preset time, the control module is configured to control the display module to display the user preset content, that is, after the controller body is placed, the display module will still display the scene mode content corresponding to the surface for a period of time from the moment the controller body is placed statically, and after waiting for a period of time, that is, after a preset time, the display module can switch the display content to the display content set by the user, such as the current temperature, humidity, or weather conditions; when the controller body moves, the control module is configured to control the display module to display scene mode content, when the controller body changes from the static state, that is, the stationary controller body is touched to move, at the moment of being touched to move, the display content of the display module is switched to the content of the scene mode corresponding to the surface, the display content of the display module is switched with the state of the controller body, thereby increasing the flexibility of use.

Specifically, in the above mode one, the user preset content includes weather condition information, current temperature information, current humidity information, and current time information, it should be noted that the user preset content may also be other information content, and which is not limited in this embodiment.

Mode Two

The display module is configured to display the content of the scene mode corresponding to itself or the content of the scene mode corresponding to the current top surface; when the static time of the controller body is greater than the preset time, the control module is configured to control the display module to display the content of the scene mode corresponding to the current top surface, that is, after the controller body is placed, the display module will still display the scene mode content corresponding to the surface for a period of time from the moment the controller body is placed statically, after waiting for a period of time, that is, after a preset time, the display module can switch the display content and switch to the scene mode content corresponding to the current top surface; when the controller body moves, the control module is configured to control the display module to display its corresponding scene mode content, that is, the stationary controller body is touched to move, at the moment when it is touched to move, the display content of the display module is switched to the content of the scene mode corresponding to the surface where it is at, and the display content of the display module is switched with the state of the controller body, thereby increasing the flexibility of use.

In the above-mentioned smart magic cube controller, the display module is an electronic ink screen, and the electronic ink screen has low power consumption, thereby being beneficial to prolong the use time of the smart magic cube controller in this embodiment, wherein, in an optional embodiment, the display module is also a liquid crystal screen, an OLED display screen or other modules configured for display, and which is not limited in this embodiment.

Specifically, the controller body of the above-mentioned smart magic cube controller is a cubic structure, and may also be other polyhedral structures, and which is not limited in this embodiment.

Specifically, the smart magic cube controller also includes a link module signally connected to the control module, and the link module is configured to be signally connected to the control terminal and the server, wherein, in an optional embodiment, the link module is a Bluetooth link module or a WIFI link module, so that the smart magic cube controller is signally connected to the control terminal via Bluetooth or WIFI, and is signally connected to the server via Bluetooth or WIFI, thereby being convenient to connect. It should be noted that the control module can also be signally connected to the control terminal and the server in other ways, and which is not limited in this embodiment.

Apparently, those skilled in the art can make various modifications and variations to the embodiments of the present disclosure without departing from the spirit and scope of the present disclosure. In this way, if these modifications and variations of the present disclosure fall within the scope of the claims of the present disclosure and their equivalent technologies, the present disclosure is also intended to include these modifications and variations.

The invention claimed is:

1. A smart magic cube controller, comprising:
   a controller body, wherein the controller body comprises a plurality of surfaces, and wherein at least one surface of the controller body is configured as a display screen;
   a posture sensing module comprising at least one of a gyroscope or an acceleration sensor, wherein the posture sensing module is configured to collect placement state information regarding the controller body; and
   a control module comprising a processing unit, wherein the control module is signally connected to the posture sensing module, wherein the control module is configured to:
      determine a current top surface of the controller body according to the placement state information collected by the posture sensing module,
      transmit a scene mode control instruction corresponding to the current top surface according to the determined current top surface, wherein the scenes mode control instruction comprises at least one of:
         an instruction to modify an operation of a light in an environment, or
         an instruction to modify an operation of an air conditioner in the environment, and
      when the display screen is located on a surface other than the current top surface and a bottom surface of the controller body:
         upon determining that a static time of the controller body is greater than a preset time, control the display screen to display content of the scene mode corresponding to the current top surface,
         upon determining that the controller body has moved, control the display screen to display the content of the scene mode corresponding to the display screen, rather than the content of the scene mode corresponding to the current top surface, and
      control a display picture of the display screen to be displayed upright.

2. The smart magic cube controller of claim 1, wherein the control module comprises a scene control unit, and a display control unit,
   wherein the processing unit is configured to determine the current top surface according to the placement state information collected by the posture sensing module,
   wherein the scene control unit is configured to transmit a scene mode control instruction corresponding to the current top surface according to the current top surface, and
   wherein when the display screen is located on a surface other than the current top surface and the bottom surface of the controller body, the display control unit is configured to control the display picture of the display screen to be displayed upright according to the placement state information collected by the posture sensing module.

3. The smart magic cube controller of claim 1, wherein each of the surfaces of the controller body is configured as a respective display screen, and each of the display screens is signally connected to the control module.

4. The smart magic cube controller of claim 1, wherein the display screen is further configured to display user preset content comprising weather condition information, current temperature information, current humidity information, and current time information.

5. The smart magic cube controller of claim 1, wherein the display screen is an electronic ink screen.

6. The smart magic cube controller of claim 1, wherein the controller body is a cube structure.

7. The smart magic cube controller of claim 1, further comprising a link module signally connected to the control module, the link module comprises at last one of a Bluetooth link module or a WIFI link module, and the link module is configured to be signally connected to a control terminal and a server.

8. The smart magic cube controller of claim 2, wherein each of the surfaces of the controller body is configured as a respective display screen, and wherein each of the display screens is signally connected to the control module.

9. The smart magic cube controller of claim 1, wherein the scenes mode control instruction comprises:
   the instruction to modify the operation of the light in the environment, and
   the instruction to modify the operation of the air conditioner in the environment.

10. The smart magic cube controller of claim 1, wherein the control module is configured to transmit the scene mode control instruction to a server, and
    wherein the server is configured to cause at least one of:
       a modify to the operation of the light in the environment, or a modification the operation of the air conditioner in the environment.

* * * * *